March 18, 1969 R. J. SCHWARTZ 3,434,105
WELL LOGGING SYSTEMS
Filed March 2, 1967

INVENTOR.
ROBERT J. SCHWARTZ
BY *Brumbaugh, Free,*
*Graves & Donohue*
his ATTORNEYS

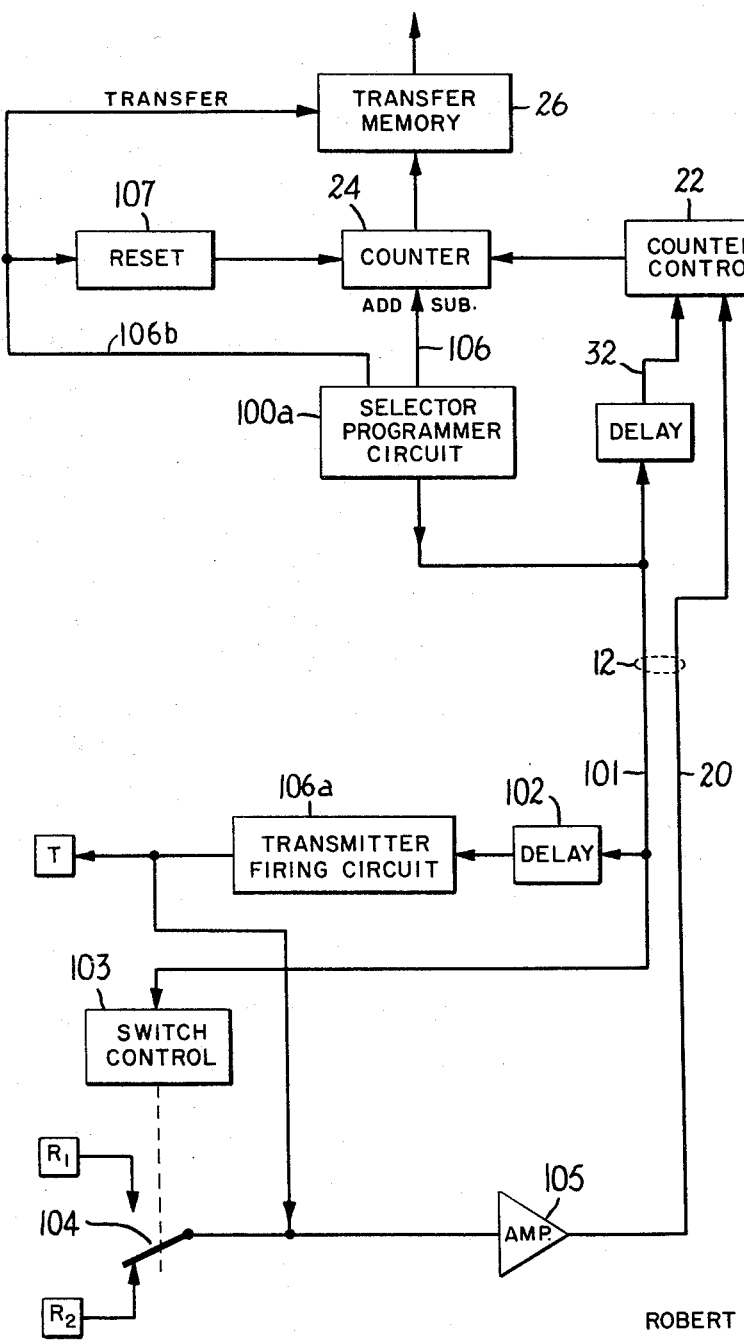

United States Patent Office 3,434,105
Patented Mar. 18, 1969

3,434,105
WELL LOGGING SYSTEMS
Robert J. Schwartz, Houston, Tex., assignor to Schlumberger Technology Corporation, Houston, Tex., a corporation of Texas
Filed Mar. 2, 1967, Ser. No. 620,165
U.S. Cl. 340—18
Int. Cl. G01v 1/40
11 Claims

ABSTRACT OF THE DISCLOSURE

A well bore logging system providing an analog output signal representing the acoustic travel time per unit distance over a longitudinal formation zone which may be greater than the longitudinal span defined between a pair of acoustic transducers. Electrical signals from one or more of the transducers are converted into digital signals that are successively entered into consecutive stages of a digital shift register in synchronization with movement of the well tool over predetermined depth increments. One or more of the signals stored in the stages of the shift register are selected and combined to provide an analog signal representing travel time measurement corresponding to a multiple of the span between the acoustic transducers.

---

This invention relates to logging systems useful in a well conduit traversing earth formations for determining a characteristic property in the well conduit by means of a well logging tool. Specifically, the invention deals with improved systems of this type for obtaining indications of the property of the formations over a distance or longitudinal span different from the longitudinal measuring span associated with the well tool itself by means of digital processing. The invention also deals with processing of digital signals relative to measurements in a well conduit.

It is now common practice to use the transmission of acoustic energy to log earth formations between an acoustic transmitter and one or more longitudinally spaced acoustic receivers carried by a logging tool. Depending on the properties of the formations, several different spans or spacing between the acoustic transmitter and receiver, or between one or more receivers, are used. For example, a large span or receiver spacing is employed where a smooth logging curve is desired. On the other hand, short receiver span measurements are usually implemented when a high degree of resolution is required.

At the present time, certain logging tools are equipped with acoustic receivers which have a fixed span of, for example, one or two feet, and this limits the length of the longitudinal formation zone which can be logged for each acoustic transmission. If a different span is required during a logging run, the tool must be lifted out of the borehole and exchanged for a tool outfitted to make acoustic measurements over the desired span. Another solution has been to employ a tool having one transmitter and two or more receivers spaced longitudinally in the tool at given intervals. With this type of tool, the span can be changed by selecting any one receiver or pair of receivers to obtain the desired receiver spacing. In certain instances, however, practical considerations dictate that the distance between the various acoustic transducers located in the well tool remain fixed in order to achieve satisfactory logging results. In these situations, the above-described tool using two or more selectable receivers to change the receiver span is obviously unsatisfactory.

It is therefore among the primary objects of the present invention to provide improved logging systems in which a single logging tool may be used to obtain measurements corresponding to logging spans which are different from the fixed span of the logging tool.

Another object of the invention is to provide improved logging systems of the type described employing digital techniques for processing electrical logging signals.

A further object of the invention is to provide improved systems for processing and combining successive electrical indications of a property of the logged formation.

A still further object of the invention is to provide systems and apparatus for varying the effective logging span of a logging tool.

Yet, another object of the invention is to provide improved digital and simplified systems for processing digital logging signals.

Another object of the invention is to provide improved logging systems for obtaining information relating to the travel time of an acoustic signal thorugh borehole formations.

Briefly, these and other objects of the invention are obtained by selecting storing in a series of storage units successive electrical measurements from the acoustic transducers in the logging tool at a rate synchronized with the movement of the logging tool through the borehole. Certain of the electrical measurement signals are stored and advanced consecutively through the storage units under control of a signal related to movement of the logging tool, and the rate of storage of such signals may be substantially less than the rate at which consecutive measurements are produced by the acoustic transducers. Those measurements that are not selected for storage can be discarded. The stored electrical measurements produced at positions of the logging tool separated by a distance corresponding to the span defined between two or more acoustic receivers are then sampled, preferably successively, and combined to generate an analog output signal, which may have a value representing the average of the sampled measurements. Preferably, the electrical measurements are in digital form and are stored in a register having a number of stages exceeding the number of electrical measurements that are sampled in any given sequence.

In a preferred embodiment, the system is employed for measuring the travel time of acoustic energy over a longitudinal formation zone greater than the span between a pair of receivers, and the sampled electrical indications each represent the formation travel time of the acoustic energy at successive positions of the logging tool separated by distances equal to the receiver span. Also, the sampled electrical indications are combined in such a manner that the output signal is representative of the average travel time per receiver span. For expedience, sampling of the electrical indications may be carried out at a rate substantially greater than the rate of storage of successive electrical indications, and the sampled electrical indications, if in digital form, fed through a digital-analog converter. The analog signals corresponding to the sampled electrical indications may then be conveniently averaged by recording them with recording apparatus having a response time substantially less than the sampling cycle time.

For a better understanding of the invention, together with the further aspects, objects, and advantages thereof, reference may be made to the following detailed description, taken in conjunction with the accompanying drawings, in which:

FIGURE 6 is a block diagram of apparatus usable with the present invention.

Figure 1:
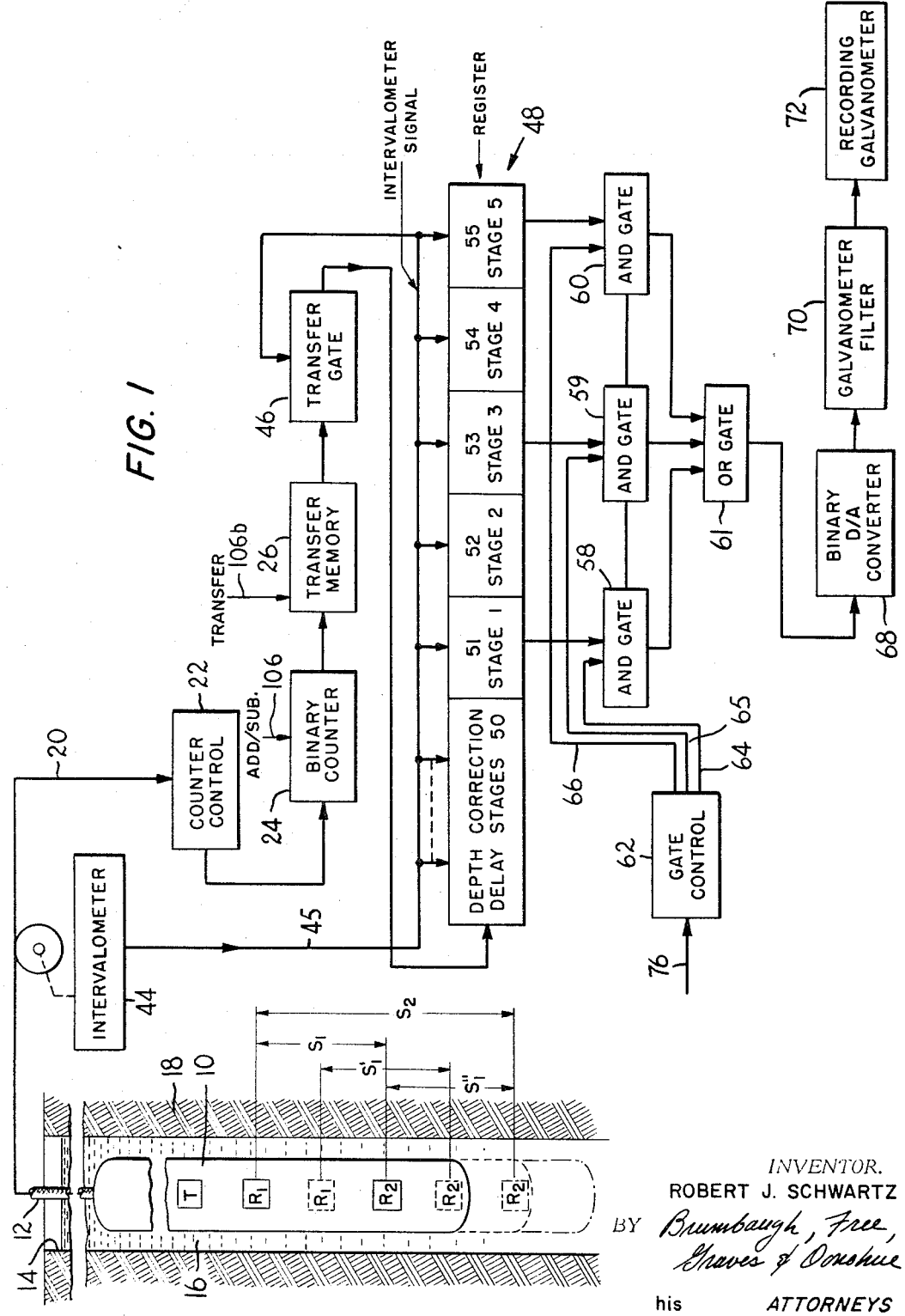
FIGURE 1 is an electrical block diagram of a logging system in accordance with the invention.

For convenience, the invention will be described in connection with the measurement of travel time of acoustic tanrsducers. In FIGURE 1, a logging tool 10 is supported by an armored electrical cable 12 for passage through a borehole 14, which may be filled with a drilling fluid 16. The tool 10 includes an electroacoustic transmitter T for transmitting acoustic energy and a pair of receivers $R_1$, $R_2$ for receiving acoustic energy and defining between them a longitudinal span $s_1$. The tool 10 can be used in an open borehole defined by surrounding earth formation 18 or can be used in a cased well bore.

It is noteworthy at this point that the present invention is equally compatible with multireceiver and transmitter systems, such as the four-receiver two-transmitter system disclosed in my copending application Ser. No. 356,186, filed Mar. 31, 1964, now Patent No. 3,304,537, and assigned to the assignee of this invention.

Rather than complicate the present disclosure with details of a four-receiver two-transmitter system as disclosed in the above application or the details of a two-receiver two-transmitter system as shown in Patent No. 3,257,639, an abbreviated system will now be described for obtaining successive time measurements. However, it should be appreciated that the present invention is concerned with the processing of successive digitalized signals from a borehole instrument to obtain a selected output result.

In one aspect of the present invention, the selected output result is a combination of such successive digitalized signals and representative of a measurement over a greater section of the well bore than the distance between the measurement means used to derive the successive digitalized signals.

As shown in FIGURE 6, a surface located programming circuit 100a provides successive timing signals via a conductor path 101 in electrical cable 12 to a delay circuit 102 in the tool and to a switch control means 103. The switch control 103 operates a switch 104 to alternately connect one of the two receivers $R_1$ or $R_2$ to an output channel 105. After switching between receivers has occurred, the appropriately chosen delay of circuit 102 actuates a transmitter firing circuit 106a which, in turn, pulses the transmitter and, at the same time, a fire pulse signal is sent to the output channel 105 for transmission to the surface as an indication of the time of transmitter firing. The generated acoustical energy is successively intercepted by receivers $R_1$ and $R_2$ and a receiver signal from one receiver is passed via the switch 104 to the output channel 105 for transmission to the surface as an indication of the energy received by the receiver. On successive timing signals, the receivers alternate so that successive signals sent up the cable 12 represent the time of firing of the transmitter, the $R_1$ signal, the time of transmitter firing and the $R_2$ signal in a repetitive sequence.

From the foregoing, it will be appreciated that if the time interval between the transmitter firing and the $R_1$ signal is subtracted from the time interval between the next transmitter firing and the $R_2$ signal that the difference will be the time required for acoustic energy to pass along the formations between receivers. This time measurement can be related to porosity of the formations in a well known manner. It should be appreciated that the rate of firing for $TR_1$ and $TR_2$ is sufficiently fast that the tool moves negligibly between two successive firings. Thus, the measurements are obtained over substantially the same section in the well conduit.

The transmitter T signals and receiver R signals are transmitted over a conductor path 20 to a surface located counter control unit 22. In brief, the counter control unit 22 supplies pulse signals to a bidirectional binary counter 24 in response to the first electrical signal (from the transmitter) to arrive over the conductor 20. The counter 24 then begins to count at a uniform rate and continues to do so until the counter control unit 22 stops the supply of pulse signals to the counter 24, the control unit 22 stopping in response to an electrical signal on the conductor 20 from the receiver $R_2$. The count accumulated by the counter 24 during the counting interval is therefore a digital binary number representing the travel time of acoustic energy between the transmitter and receiver $R_2$.

The circuit 100 also provides via a conductor path 106 an add-subtract direction to the counter 24. Thus, on the next timing pulse, the counter is set to subtract. The subsequent transmitter T and receiver $R_1$ signal start and stop the supply of pulse signals to the counter 24 and the counts occurring between this time interval are subtracted from the previous $TR_1$ count. After the end of a $TR_1$ and $TR_2$ cycle, the circuit 100 produces a transfer instruction over the conductor 106b to condition an intermediate transfer memory unit 26 to accept the digital count in the counter 24 and to discard the previously held count. The net count is then temporarily stored on an intermediate transfer memory unit 26 and the counter is cleared immediately thereafter by a reset 107 (operated by the signal in the conductor 106b) to develop the next net count as described previously.

In the multitransmitter and receiver systems such as the 2T–4R system previously mentioned, several individual acoustic measurements (between each transmitter-receiver pair) are combined to yield a single acoustic measurement indicative of the desired properties of the surrounding borehole media and free from many of the errors commonly associated with acoustic travel-time logging. In such systems, the individual acoustic measurements are developed sequentially so that a total of four individual measurements are processed by the counter to yield the final electrical indication of the desired measurement. For example, as each travel time measurement is received, the count on the counter changes by a corresponding digital quantity. In the 2T-4R system two of such digital quantities are added, while the remaining two are subtracted in the counter, which is preferably of the bidirectional type in these applications.

If, in the present case, the tool 10 is equipped with the 2T–4R transducer arrangement, the counter 24 may be controlled to count up or down (add or subtract) depending on the particular acoustic measurement being received. For this purpose, the system of FIGURE 1 may be provided with a selector-programmer unit (not shown) of the type disclosed in the above copending application Ser. No. 356,186 to develop the required control of the counter and associated functions. Additionally, means similar to those disclosed in that application should be provided for resetting the counter and transferring its output to the transfer memory 26 only after all four of the individual acoustic measurements have been made and processed, thus ensuring that the digital signal passed to the transfer gate 46 represents the final desired measurement, i.e., the measurement derived from the four individual converted and combined acoustic indications.

A description of a suitable counter control unit 22 may be found in the foregoing copending application. For convenience, however, this unit has been shown in detail in FIGURE 2 and a brief description of its operation may be helpful at this time.

Figure 2:
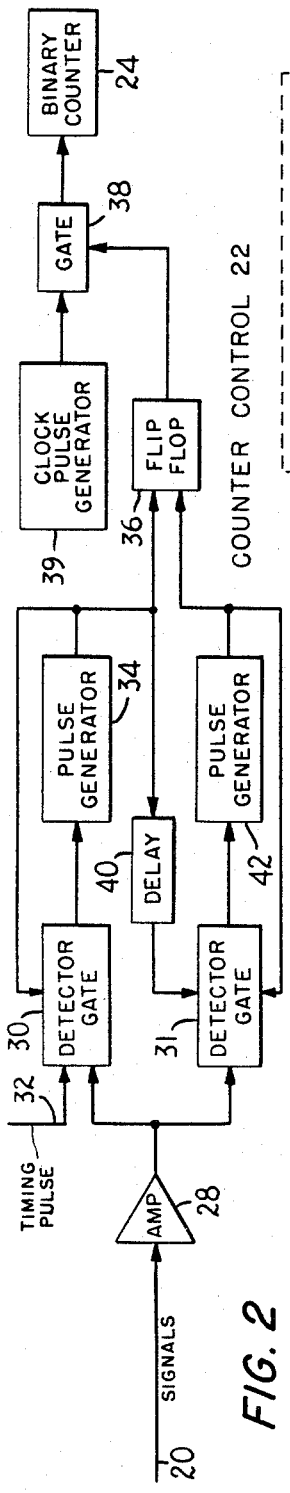
FIGURE 2 is an electrical block diagram of a portion of the apparatus included in the FIGURE 1 system.

Referring to FIGURE 2, the transmitter and receiver signals on the conductor 20 are individually amplified in the amplifier 28 and simultaneously applied to a pair of detector gates 30 and 31. A timing pulse from circuit 100 (FIGURE 6) is supplied after a suitable delay (but prior to the occurrence of a transmitter fire pulse) to the detector gate 30 over the conductor 32 to energize the gate 30 shortly before the arrival of an electrical signal representing the transmitter firing. At this time, the detector gate 31 is in the closed or blocking condition.

Upon arrival of the amplified electrical signal from the output circuit 105, the signal is passed through the detector gate 30 to the pulse generator 34 which develops an output pulse indicating the arrival of an electrical signal at the surface. This pulse, in turn, activates a flip-flop 36, the output of which opens the gate 38 to allow constant frequency pulses from a clock pulse generator 39 to pass to the binary counter 24. In addition, the pulse from the pulse generator 34 energizes a delay unit 40 which, after a short period of time (prior to the earliest expected receiver signal), opens the detector gate 31. At the same time, this pulse is used to deactivate gate 30, which returns to the "off" condition.

Upon arrival at the surface, the signal from the receiver $R_2$ passes through the now open detector gate 31 to the pulse generator 42 which generates at its output a pulse to return the flip-flop 36 to its original state, thereby checking the flow of clock pulses to the counter 24. Simultaneously, this output pulse is employed to again close the detector gate 31 and place the unit 22 in condition to receive the next successive electrical signal from the transmitter. At this point, the count accumulated by the binary counter 24 is a digital signal representing the travel time of the transmitted acoustic wave between the transmitter and receiver $R_2$. The next succeeding transmitter and receiver ($R_1$) signals operate the gate 38 in a similar manner. In 2T–4R transducer arrangements, two additional digital signals will be developed by the counter before the final count is passed to the memory 26, with each additional digital quantity being added or subtracted to the first in accordance with a predetermined sequence provided by the selector-programmer unit briefly mentioned earlier.

In accordance with the invention, the travel time of the acoustic energy over a longitudinal span $s_2$ greater than the span $s_1$ defined between the receivers $R_1$, $R_2$ can be determined. As previously mentioned, this could be done by removing the tool 10 from the borehole 14 and exchanging it for another having a different receiver spacing or, alternatively, to employ a tool having several receivers spaced apart at a distance equal to the desired span and then selectively coupling the receivers corresponding to the span desired to the cable. However, this is not always possible or desirable. In the FIGURE 1 system, $\Delta t$ measurements stored on the transfer memory 26 are processed, in a manner now to be described, to develop an output signal representing a travel time measurement equivalent to that which would be obtained using a receiver spacing other than the spacing $s_1$.

For purpose of explanation, it will be assumed that the receiver span is one foot and that the formations 18 are logged at a rate of 3600 ft. per hour so that the tool 10 moves through the borehole 14 at a rate of 1 foot per second. It will also be assumed that the transmitter T is rapidly pulsed twice at each six-inch interval along the borehole to send acoustic energy through the formations 18 and make appropriate measurements, although in the usual case this interval will be much smaller, with only certain of the signals stored in the memory 26 being additionally processed. Beginning with the tool 10 in the lowermost position shown by the phantom lines, the transmitter T is excited twice and a first measurement is obtained representing the travel time of the acoustic waves over the longitudinal formation zone $s_1''$ defined between the receivers $R_1$, $R_2$. After the tool 10 has traveled uphole a distance of six inches, the transmitter T is again pulsed twice and a second $\Delta t$ measurement is obtained representing the acoustic travel time over the longitudinal formation zone $s_1'$.

After the next six-inch incremental movement of the tool, the receivers $R_1$ and $R_2$ are in the positions shown so that a third $\Delta t$ measurement corresponding to the next one-foot formation zone $s_1$ is developed, and so on. Successive electrical indications of the travel time of the acoustic energy through the formations are therefore produced for every ½ foot movement of the logging tool through the bore. In the case described, the logging tool 10 has moved through a longitudinal distance of 1 foot and has logged the formations 18 between the lower limit of the receiver $R_2$ and the upper limit of the receiver $R_1$, or a distance or span of $s_2$ which is 2 feet. By combining the indications obtained from successive logging measurements over the spans $s_1''$ and $s_1'$, the average travel time $\Delta t$ over the span $s_2$ of acoustic energy per receiver span $s_1$ can be derived.

Continuing with the description, a conventional intervalometer 44 supplies, over the conductor 45, pulses at a rate synchronized with the movement of the tool 10 through the borehole 14 to the control terminal of a transfer gate 46 receiving the digital output from the transfer memory 26. In the above example, the intervalometer 44 will supply a pulse at ½ foot intervals of movement through the borehole. In this manner, the contents of the transfer memory 26 are gated under control of the intervalometer pulses through the transfer gate 46 after every ½ foot movement of the tool 10, and it is not ordinarily necessary that the intervalometer pulses be synchronized or timed with the transfer signal to the memory 26, owing to the small probability of coincidence of the intervalometer and memory transfer signals and the signal response of the transfer circuits. The transferred digital signal is applied to a register 48 containing several stages 50 to provide depth correction delay of the ultimate output signals, as will be explained subsequently, and the consecutive stages 51, 52, 53, 54 and 55. It should be noted that the binary digital quantity or word transferred from the memory 26 may contain several bits, each of which is transferred in parallel to a corresponding element of the first stage of the register 48. Typically, a 10-bit word is used so that each register stage is capable of storing ten informational bits. For simplicity, however, only one element of each register stage has been illustrated.

Each intervalometer pulse on the conductor 45 is also simultaneously applied to each of the register stages 50 and 51–55 to transfer the digital word stored in each stage to the next consecutive stage, the digital information in the last stage 55 being discarded as it receives the information from the stage 54. Thus, when the transmitter T is pulsed twice to transmit acoustic energy over the formation zone $s_1''$, a digital signal corresponding to $\Delta t$ through this zone is developed and stored in the memory 26, and the intervalometer signals the transfer of the preceding digital quantity from the memory 26 to the first stage of register 48.

After development of the next electrical indication corresponding to the travel time of acoustic energy through the distance $s_1'$, another signal from the intervalometer 44 is applied over conductor 45 both to the transfer gate 46 and stages 50 and 50–55 of the register 48, thus entering the signal corresponding to the span $s_1'$ in the first stages 50 and shifting the $s_1''$ information contained in the first stage to a consecutive stage. Simultaneously, the digital information stored in the following register stages is transferred to their respective consecutive stages. As noted above, the digital word in the last stage 55 is dropped, with the accompanying shifting of the contents of each stage to one stage to the right, to make room for the incoming digital word at stage 51. As will be recognized, therefore, the stages 50 (as well as stages 51, 55) function as a shift register.

The number of depth correction delay stages 50 will be related to the amount of distance delay desired at the pulse rate (pulses/foot) of the intervalometer. The stages 50 of the register 48 transfer each digital word consecutively from one stage to the next upon each occurrence of an intervalometer pulse. Thus, when a digital word from the memory 26 finally reaches the stage 51, it will have been delayed in time by an amount equal to the time required for the tool 10 to move a given distance through the borehole. In FIGURE 1, the stages 51–55 are at the end of the register chain of stages, and thus the $\Delta t$ information to be extracted from these stages may be read out simultaneously with different information gained from other instruments (not shown) carried by the tool but physically located near the so-called center of measurement of the sonic transducers T, $R_1$, $R_2$. All such information therefore, is correlated to a single point or measurement zone in the borehole.

For purpose of explanation, we may assume that the lowermost instrument in the tool is located ten feet below the center of measurement of the sonic transducer and that it is wished to read out the $\Delta t$ information simultaneously with information derived from this instrument, so that all information relates to the same formation zone even though the tool continues to move through the borehole. If a pulse from the intervalometer is developed for every ½ foot of tool movement, then $2\times10=20$ register stages are needed in the group of stages 50 to provide the necessary delay of the $\Delta t$ signals. It should be remarked that the consecutive stages 51–55 may be located anywhere within the register stage chain, depending on the delay required.

After movement of the tool over a predetermined distance, during which time the $\Delta t$ digital signal corresponding to the $s_1''$ zone consecutively advances through the register 50, the signal is transferred from the last of the stages 50 into the stage 51. Upon arrival of the next digital word, corresponding to the zone $s_1'$, the $s_1''$ signal is transferred to stage 52, with the $s_1'$ information now stored in stage 51.

The acoustic arrival time signal through the longitudinal formation zone $s_1$ is similarly applied to the first stage 51 of the register 48, whereupon the information corresponding to the $s_1'$ and $s_1''$ zones is transferred to the respective stages 52 and 53. As will be apparent shortly, two further digital words will be stored in the register 48 as the tool 10 moves through an additional distance of one foot, each word corresponding to travel time over successive one-foot zones six inches apart. At this point, stage 55 contains $s_1''$ information stage 54 $s_1'$ information, stage 53 $s_1$ information, and stages 51 and 52 the digital words corresponding to the preceding two acoustic measurements.

It is apparent that the stages 51–55 in the register 48 contain digital signals representing the acoustic travel time through successive longitudinal 1-foot formation distances defined between the receivers $R_1$ and $R_2$, each of the distances being displaced from the next by six inches.

As already noted, it has been assumed that the acoustic transmitter is excited at six-inch intervals of sonde movement. It is clear, however, that the repetition rate of transmitter excitation may be much higher, for example 20 or 10 per second (every 1–2 inches of tool movement). In such case, only certain of the electrical indications held by the memory unit 26 will be processed through the register 48, as determined by the intervalometer pulses or conductor 45. From the foregoing description, it will be realized that the register 48 need not take any particular form, as long as the described storing functions can be performed. Accordingly, any of a number of known types of storage circuits may be employed, such as the solid state, vacuum tube, and ferrite memory plane or other magnetic types.

As explained above, the electrical indications, or digital signals corresponding to the logged longitudinal zones $s_1''$, $s_1'$ and $s_1$, may be combined to derive an output signal representing the effective average travel time of acoustic energy per receiver span over a formation zone having a different dimension, e.g., $s_2$. For a tool in which the receiver span or spacing is one foot, the output signal will represent the average acoustic travel $\Delta t$ per foot over a zone determined by the number of successive $\Delta t$ indications that are combined.

In the FIGURE 1 system, the effective span is chosen by periodically sampling the output of stage 51 for an effective one-foot span, stages 51 and 53 for a two-foot span, and stages 51, 53 and 55 for an effective three-foot span. From the preceding it will be realized that at the time stage 55 of the register 48 contains digital information of the travel time through one formation zone, stage 53 holds information of acoustic travel time through a formation zone one-foot uphole of the first zone, and stage 51 holds $\Delta t$ information for the formation zone two feet uphole from the first zone. The outputs of these stages are routed to respective AND gates 58, 59 and 60 each of which, like the register stages, includes a number of elements sufficient to accept the number of information bits of the words stored in the register. A single three-input terminal OR gate 61 connected to the outputs of the AND gates receives, upon activation of the respective AND gate, the digital signal stored in one of the register stages 51, 53 or 55.

A gate control unit 62 supplies sampling pulses over the conductors 64, 65 and 66 to control the gating action of the associated AND gates 58, 59 and 60 only one at a time in a sequence depending on the effective span desired. For example, if a travel time $\Delta t$ sec./ft. is desired for an effective receiver spacing of two feet, the gates 58 and 59 are energized by the sampling pulses to alternately pass the contents of stages 51 and 53 to the OR gate 61. It is understood that the OR gate 61 is capable of accepting the same number of bits as the gates 58–60. Only one element of the gate 61, however, is shown for simplicity. If an effective receiver span of three feet is wanted, the gates 58, 59 and 60 are activated in sequence so that the OR gate 61 receives first the output of the stage 51, then the output stage 53, and finally the output of stage 55. For $\Delta t$ measurements over a 1 foot span, the AND gate 58 only is continuously enabled.

The digital signals gated through the OR gate 61 are converted into analog signals in the binary digital/analog converter 68 which yields pulses having durations equal to the lengths of the sampling pulses and amplitudes proportional to the sampled digital quantities. The analog pulses are then filtered in the galvanometer filter 70 and applied to a recording galvanometer 72.

In the ordinary case where the average acoustic travel time per receiver span is desired, each of the gates 58, 59 and 60 will be energized for equal periods of time.

It is desirable that the sampling rate be greater than the rate at which successive electrical indications from the transfer memory 26 are transferred through the individual stages of the 5-stage register 48. For a register shifting rate of, say, 2 shifts/sec., the sampling rate might be 20–300 samples/sec. The pulse output of the binary digital/analog converter 68 will then also have a frequency of about 20–300 pulses/sec. When these analog pulses are applied to the galvanometer filter 70, they are effectively averaged to produce a continuous analog signal for recording by the recording galvanometer 72. By thus making the combined response of the galvanometer filter 70 and the recording galvanometer 72 substantially less than the rate at which pulses appear at the output of the converter 68, the sampled quantities from the stages 51, 53 and 55 representing acoustic travel times can be conveniently averaged.

Figure 3:
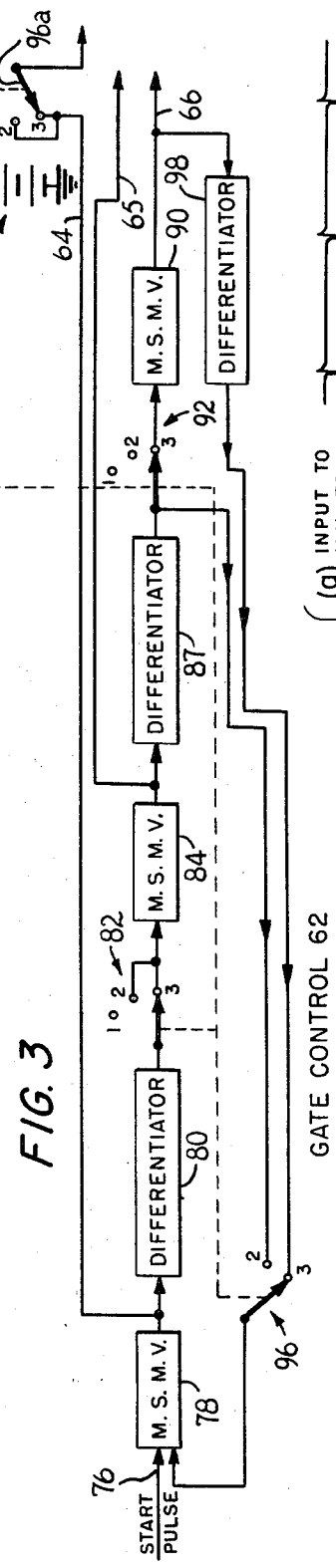
FIGURE 3 is an electrical block diagram of another portion of the apparatus shown in the FIGURE 1 system.
Figure 4:
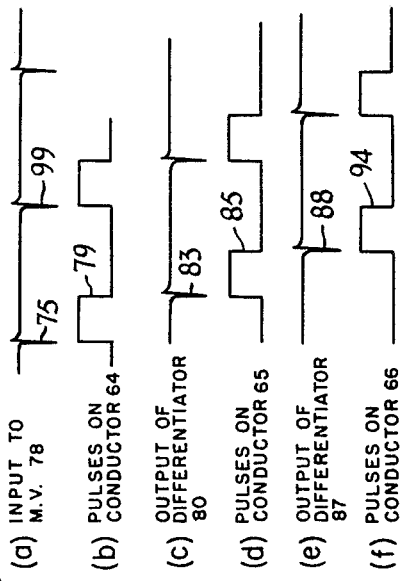
FIGURE 4 is a graph of representative electrical signals helpful in explaining the operation of the apparatus shown in FIGURE 3.
Figure 5:
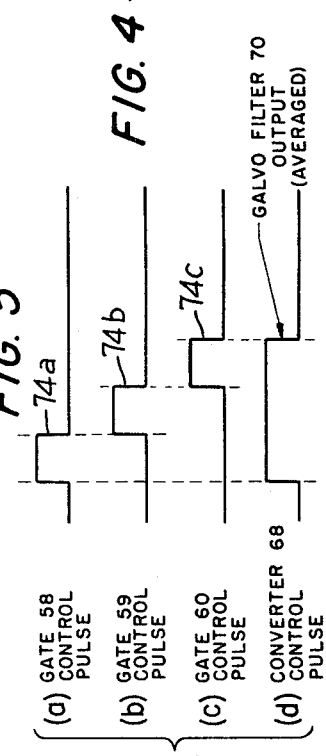
FIGURE 5 is a graph of electrical waveforms useful in understanding the operation of a portion of the FIGURE 1 system.

FIGURE 3 depicts in detail a representative type of gate control unit 62 suitable for controlling the sampling action of the AND gates 58, 59 and 60. For convenience, it is assumed that the pulses on the conductors 64, 65 and 66 are of all equal duration and that the operation of the unit 62 is initiated by a starting pulse 75 (FIGURE 4(a)) on the conductor 76 from a suitable pulse generating source (not shown). Upon receiving the starting pulse 75, the monostable multivibrator 78 generates a square sampling pulse 79 (FIGURE 4(b)) which passes to the conductor 64. The trailing edge of this pulse is differentiated in the unit 80 to produce the sharp pulse 83 (FIGURE 4(c))

for application through a selector switch 82 when in position "2" or "3" to a second monostable multivibrator 84. The pulse 83 triggers the multivibrator 84 to generate a sampling pulse 85 (FIGURE 4(d)) on the conductor 65. A second differentiator 87 shapes the trailing edge of the pulse 85 to produce the pulse 88 (FIGURE 4(e)). The pulse 88, in turn, is applied through a selector switch 92 in the "3" position to a third monostable multivibrator 90. Upon receiving the pulse 88, the multivibrator 90 generates a third sampling pulse 94 for application to the conductor 66.

As indicated by the dashed line connection, the movable contacts of the switches 82 and 92 are mechanically coupled together and to the movable contacts of ganged selector switches 96 and 96a. When the output of the first stage 51 (FGURE 1) of the register 48 is to be continuously sampled so that the recording galvanometer 72 records an output signal representing acoustic arrival times over a 1 foot receiver span, the switches 82, 92, and 96a are thrown to position "1." In this case, a D.C. signal from a D.C. source 100a is applied directly to the lead 64, thereby continuously enabling the gate 58. At the same time, the multivibrator chain of the gate control unit 62 is opened by the switch 82, and no pulses appear on conductors 65 and 66.

For Δt measurements corresponding to an effective 2-foot receiver span, the switches 82, 92, 96 and 96a are moved to position "2." The multivibrator 78 is then energized by the pulses 88 at the output of the differentiator 87, thus causing the multivibrators 78 and 84 to be triggered alternately and producing alternately occurring sampling pulses on the respective conductors 64 and 65. With the switches in the "3" position, as shown, the operation of the unit is that described in connection with FIGURE 4, wherein each output conductor 64, 65 receives every third sampling pulse to energize the AND gates 58, 59 and 60 in sequence.

From the foregoing, it is apparent that the invention provides an improved system for controllably changing the effective receiver span of a fixed-span logging tool. This is, moreover, accomplished through the use of computing equipment which is substantially less complex than the equipment that would be required to implement conventional digital computing techniques.

Although the invention has been described with reference to the specific embodiment thereof, it is understood that many modifications and variations, both in form and detail, may be made within the skill of the art. For example, it is apparent that more register stages may be employed to obtain better logging resolution and a smoother curve on the recording galvanometer 72. Thus, two stages rather than one stage may be interposed between the register stages whose outputs are sampled. In this case, digital signals are transferred between consecutive stages after every four inches of sonde movement. As a further example, analog computing techniques may be substituted for the digital elements to perform analogous functions.

All such modifications and variations, therefore, are intended to be included within the scope and spirit of the invention as defined in the appended claims.

I claim:
1. A well tool system for use in a well bore for obtaining parameter measurements corresponding to a longitudinal zone in the bore greater than a fixed span defined by a well tool comprising:
   a well tool adapted for movement through a well conduit, said well tool having means for providing measurement signals each representing a parameter measured for a given span of the well tool;
   means for converting said measurement signals to digital signals each representing said parameter corresponding to the given span at a particular location of the well tool in the bore;
   means for deriving a control signal that is a function of movement of the well tool through the borehole;
   means for sequentially storing said digital signals in response to the control signal, the storing means including a plurality of consecutive storage units of which each is adapted to store at least one digital signal, and each digital signal being transferred consecutively through the storage units at a rate determined by the movement of the tool through the well conduit;
   gating signal generator means for producing an electrical gating signal;
   gating means responsive to the gating signal for selectively sampling separate of the digital signals stored in said storing means for deriving selected digital signals, and
   means for combining said selected digital signals for obtaining a resultant analog signal representative of the parameter for such longitudinal zone and correlated to the spans corresponding to said selected digital signals.

2. The apparatus of claim 1 wherein said tool has at least two longitudinally spaced acoustical transducers defining said span; and said digital signals represent travel time of acoustic between said transducers.

3. The apparatus of claim 1 and further comprising:
   means for delaying the digital signals by an amount corresponding to the time required for the tool to move a predetermined distance through the well conduit.

4. A system as defined in claim 1, in which:
   the gating means is operative to successively transfer to the combining means digital signals in storage units corresponding to measurements obtained at different well tool locations.

5. A system according to claim 4, in which:
   the combined means includes a digital to analog converter of which the output is an analog pulse signal having an amplitude corresponding to the value of each transferred digital signal at the input thereto.

6. A system for use in a well conduit comprising, in combination:
   a logging tool adapted for movement through a well conduit and including a pair of acoustic transducers defining therebetween a longitudinal span, the transducer pair being operable to generate successive pairs of electrical indications in response to periodic transmissions of acoustic energy;
   means responsive to successive pairs of electrical indications generated by the transducers for developing corresponding successive digital signals each representing the travel time of acoustic energy transmitted between the receiver pair at a given longitudinal position of the tool in the well conduit;
   control signal responsive means for storing the successive digital signals including a plurality of storage stages each adapted to store one digital signal;
   control signal generating means supplying to the storing means a control signal for advancing successive ones of the stored digital signals from one stage to a consecutive stage of the storing means in timed relation to the longitudinal movement of logging tool through the well conduit;
   gating means including output terminals and connected to receive the stored digital signals representing travel times of acoustic energy corresponding to longitudinal logging tool positions separated by distances proportional to the longitudinal span;
   means for energizing the gating means to sequentially transfer the last-named digital signals to the respective output terminals of the gating means; and
   means including a digital to analog converter coupled to the respective output terminals of the gating means for combining the transferred digital signals to develop an analog output signal having an average amplitude representative of the acoustic travel time per unit distance over a longitudinal distance having a length different from the length of the longitudinal span defined between the transducer pair.

7. A well tool system for use in a well bore for obtaining acoustic parameter measurements corresponding to a longitudinal zone in the bore greater than a fixed span defined between acoustic transducers carried by a well tool comprising:
- a well tool adapted for movement through a well conduit, said well tool having means for providing measurement signals each representing a parameter measured for a given depth of the well tool and corresponding to the given span at a particular location of the well tool in the bore;
- means for deriving a control signal that is a function of movement of the well tool through the borehole;
- means responsive to the control signal for sequentially storing said measurement signals in a plurality of consecutive storage units of which each is adapted to store at least one such signal;
- means for sequentially sampling separate of the digital signals stored in said storing means for deriving selected signals, and
- means for combining said selected signals for obtaining a resultant analog signal representative of the parameter for such longitudinal zone and correlated to the depths corresponding to said selected signals.

8. A well tool system according to claim 7, further comprising:
- means for converting said measurement signals into digital signals each representing said parameter at the given depth and corresponding to said longitudinal span;
- said storage units comprising consecutive stages of a digital shift register and each said converted digital signal being transferred serially through such stages in response to the control signal.

9. A well tool system as defined in claim 8, in which the combining means includes:
- a digital-to-analog converter receiving said selected digital signals seriatim to derive a plurality of analog signals of which the amplitudes vary according to the quantities represented by said signals; and
- filter means for averaging said plurality of analog signals.

10. A well tool system for use in a well bore for obtaining parameter measurements corresponding to a longitudinal zone in the bore greater than a fixed span defined by a well tool comprising:
- a well tool adapted for movement through a well conduit, said well tool having means for providing measurement signals each representing a parameter measured for a given span of the well tool;
- means for converting said measurement signals to digital signals each representing said parameter corresponding to the given span at a particular location of the well tool in the bore;
- means for deriving a control signal that is a function of movement of the well tool through the borehole;
- means for sequentially storing said digital signals in response to the control signal, the storing means including a plurality of consecutive storage units of which each is adapted to store at least one digital signal, and each digital signal being transferred consecutively through the storage units at a rate determined by the movement of the tool through the well conduit;
- means for generating consecutive gating pulses at a rate exceeding the rate at which digital signals are sequentially stored,
- means for sequentially directing the gating pulses to selected ones of the storage units to thereby selectively sample separate of the stored digital signals; and
- means for combining said selected digital signals for obtaining a resultant analog signal representative of the parameter for such longitudinal zone and correlated to the spans corresponding to said selected digital signals.

11. A system for use in a well conduit comprising, in combination:
- a logging tool adapted for movement through a well conduit and including a pair of acoustic receivers defining therebetween a longitudinal span, each of the receivers being operable to generate successive electrical signals in response to received acoustic energy periodically transmitted;
- means responsive to the electrical signals generated by the respective acoustic receivers for developing successive digital signals representative of the travel time of successive transmissions of acoustic energy between the receiver pair;
- means for developing control signals at a rate synchronized with the rate of movement of the logging tool through the well conduit;
- signal storage means including a plurality of consecutive storage units for storing the respective digital signals and for advancing such signals from one unit to a consecutive unit in response to each control signal;
- output circuit means;
- gating means for transferring to the output circuit means the stored digital signals in at least certain of the storage units that represent travel time of acoustic energy at positions of the logging tool separated by distances proportional to the longitudinal span; and
- means for combining the transferred digital signals to develop an analog output signal representative of the acoustic travel time over a longitudinal distance longer than the longitudinal span defined between the receiver pair.

References Cited

UNITED STATES PATENTS

| | | | |
|---|---|---|---|
| 3,166,709 | 1/1965 | Doll | 340—18 X |
| 3,172,036 | 3/1965 | Waters. | |
| 3,181,117 | 4/1965 | Sloughter | 340—18 |
| 3,207,256 | 9/1965 | Blizard | 340—18 X |
| 3,208,548 | 9/1965 | Levin et al. | 340—18 X |
| 3,277,440 | 10/1966 | Gouillard et al. | 340—18 |
| 3,329,931 | 7/1967 | Tanguy | 340—18 |

RICHARD A. FARLEY, *Primary Examiner.*

DANIEL C. KAUFMAN, *Assistant Examiner.*